US011185789B2

(12) United States Patent
Arbia

(10) Patent No.: US 11,185,789 B2
(45) Date of Patent: Nov. 30, 2021

(54) TOY

(71) Applicant: FERRERO TRADING LUX S.A., Senningerberg (LU)

(72) Inventor: Giovanni Arbia, Chieri (TO) (IT)

(73) Assignee: FERRERO TRADING LUX S.A., Senningerberg (LU)

( * ) Notice: Subject to any disclaimer, the term of this patent is extended or adjusted under 35 U.S.C. 154(b) by 0 days.

(21) Appl. No.: 16/469,793

(22) PCT Filed: Nov. 24, 2017

(86) PCT No.: PCT/IB2017/057384
§ 371 (c)(1),
(2) Date: Jun. 14, 2019

(87) PCT Pub. No.: WO2018/109591
PCT Pub. Date: Jun. 21, 2018

(65) Prior Publication Data
US 2020/0086224 A1 Mar. 19, 2020

(30) Foreign Application Priority Data
Dec. 16, 2016 (LU) .......................................... 93378

(51) Int. Cl.
*A63H 17/26* (2006.01)
*A63H 17/00* (2006.01)
(Continued)

(52) U.S. Cl.
CPC ........... *A63H 17/262* (2013.01); *A63H 17/00* (2013.01); *B29C 45/16* (2013.01); *B29K 2023/06* (2013.01); *B29L 2031/52* (2013.01)

(58) Field of Classification Search
CPC ... A63H 17/00; A63H 17/262; B29C 45/0017
See application file for complete search history.

(56) References Cited

U.S. PATENT DOCUMENTS 2,383,441 A * 8/1945 Beile .................... A63H 17/002
446/469
3,694,958 A * 10/1972 Parker .................. A63H 17/262
446/465
(Continued)

FOREIGN PATENT DOCUMENTS

DE  20 2005 015711 U1  1/2006
EP  0 074 765 A1  3/1983
(Continued)

OTHER PUBLICATIONS

International Search Report and Written Opinion issued for International Application No. PCT/IB2017/057384 dated May 18, 2018, 15 pages.

*Primary Examiner* — Eugene L Kim
*Assistant Examiner* — Alyssa M Hylinski
(74) *Attorney, Agent, or Firm* — Rothwell, Figg, Ernst & Manbeck, P.C.

(57) ABSTRACT

Described herein is a method for producing a toy, in particular a toy car.
According to a preferred embodiment, said method envisages implementing a process of injection moulding that envisages a first step of forming the base body (40) of the toy car, and, then, a second step of forming the wheels (60), which is carried out directly on the base body formed previously.
The toy car obtained is characterized in that it presents a connection that cannot be separated between the wheels and the base body.

4 Claims, 9 Drawing Sheets

(51) Int. Cl.
*B29C 45/16* (2006.01)
*B29L 31/52* (2006.01)

(56) References Cited

U.S. PATENT DOCUMENTS

| | | | | | |
|---|---|---|---|---|---|
| 3,699,715 | A | * | 10/1972 | Lewis | A63H 3/46 446/376 |
| 4,361,980 | A | * | 12/1982 | Chatani | A63H 5/00 301/111.01 |
| 5,298,215 | A | * | 3/1994 | Krause | B29C 45/0017 264/242 |
| 5,919,077 | A | * | 7/1999 | Gondcaille | A63H 17/262 446/469 |
| 5,989,658 | A | * | 11/1999 | Miura | A63H 3/46 264/241 |
| 9,022,830 | B2 | * | 5/2015 | Sambenedetto | A63H 3/16 446/102 |
| 2002/0180256 | A1 | * | 12/2002 | Reich | B60B 37/00 301/111.01 |

FOREIGN PATENT DOCUMENTS

| | | | | |
|---|---|---|---|---|
| EP | 2 281 673 | A1 | | 2/2011 |
| EP | 2 900 345 | A1 | | 8/2015 |
| GB | 2105206 | A | * | 3/1983 ........... A63H 17/262 |
| WO | 2014049126 | A1 | | 4/2014 |

* cited by examiner

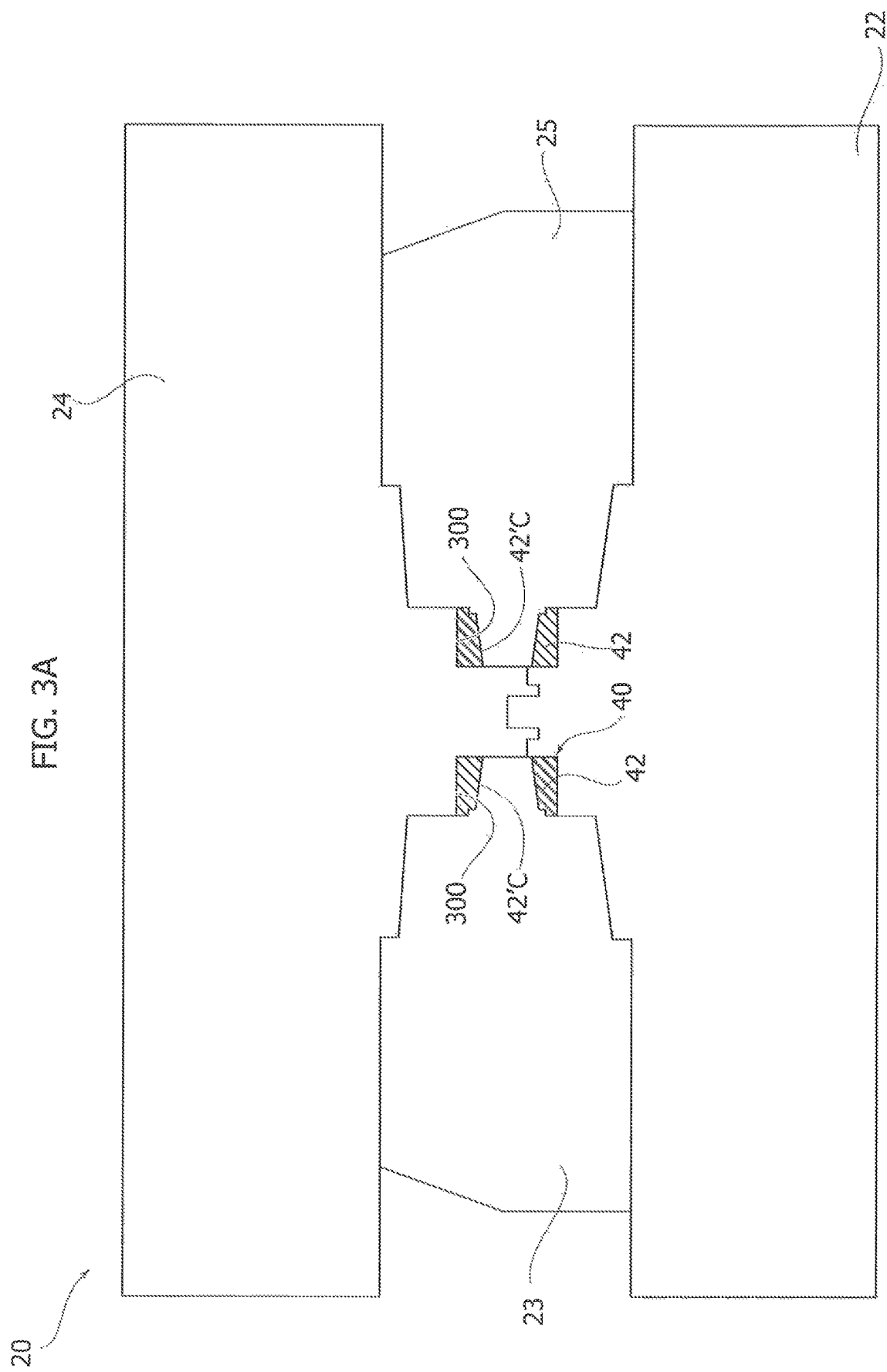

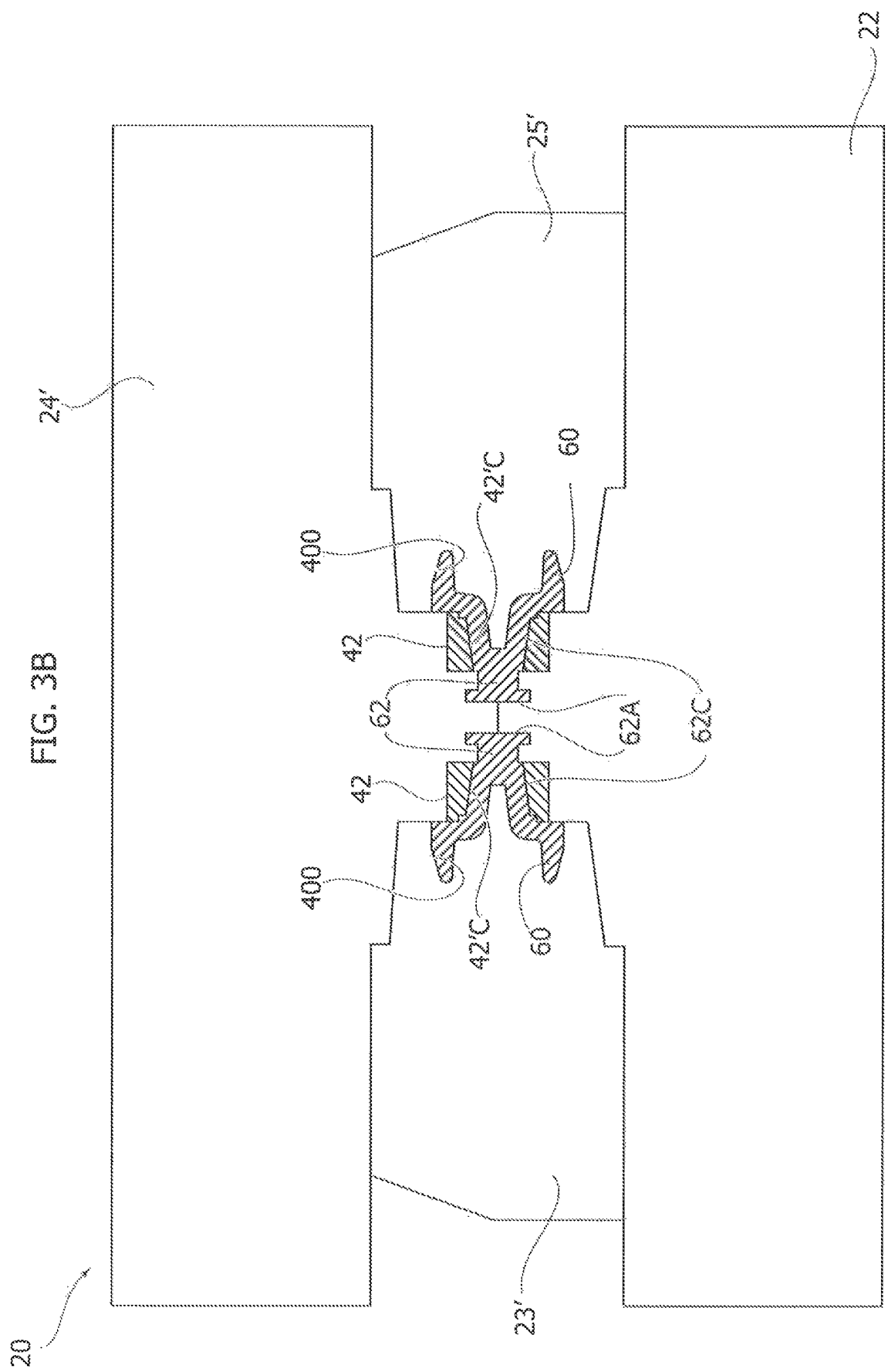

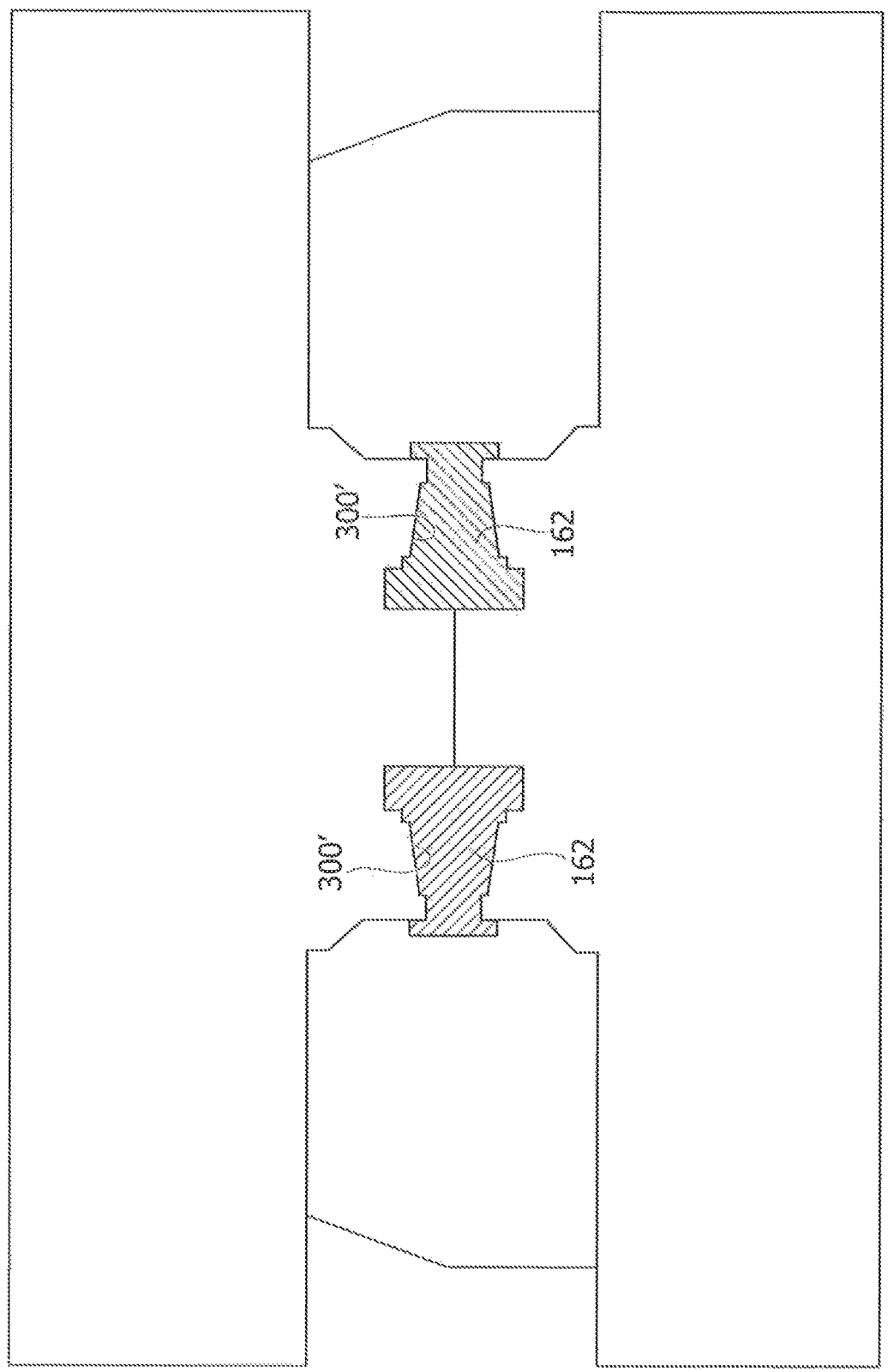

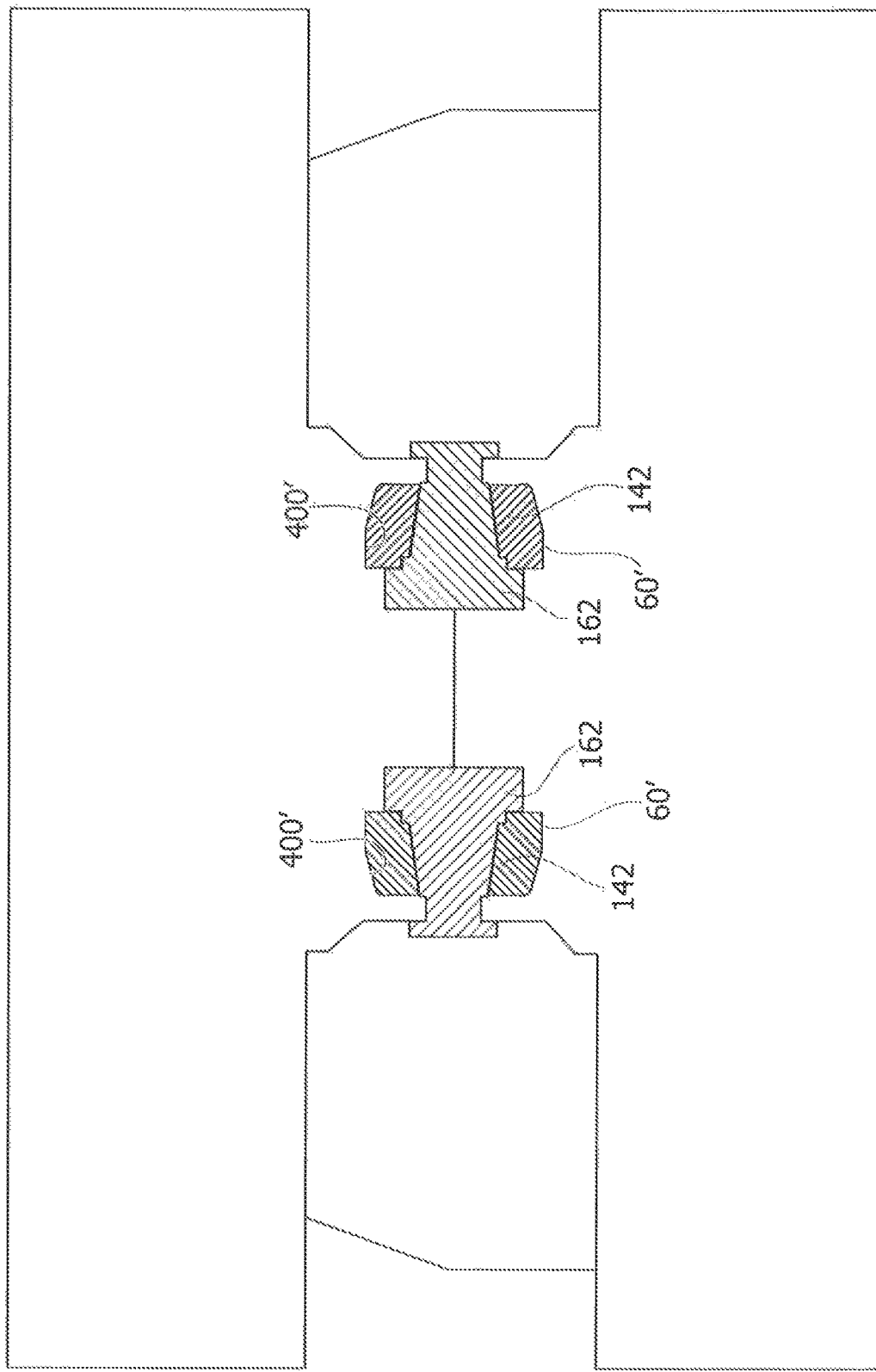

TOY

CROSS REFERENCE TO RELATED APPLICATION

This application is a 35 U.S.C. § 371 National Phase Entry Application from PCT/IB2017/057384, filed on Nov. 24, 2017, and designating the United States, which claims the benefit of Luxembourgian Patent Application No. 93378 filed on Dec. 16, 2016 with the Luxembourgian Intellectual Property Office, the disclosures of which are herein incorporated by references in their entirety.

FIELD OF THE INVENTION

The present invention relates to the field of toys and in particular toys made of plastic material obtained via injection moulding. In this context, the present invention concentrates on toys that are provided with wheels for their movement, such as for example toy cars.

In the above field, the present invention proposes a new method of production of a toy and a new innovative solution of toy.

PRIOR ART

A typical example of toy cars or vehicles is described in the document No. EP 0074765. This is made up of a limited number of components, which are a base body, a bodywork, and a series of wheels mounted on the base body. The base body is made of a single piece of plastic material that incorporates the four shafts on which the wheels of the toy vehicle are mounted. The shafts in question have widened ends, via which the wheels are slotted thereon.

It should now be noted that in the technical field in question there is a constant need to find new solutions that enable one or more of the following targets to be achieved:

simplifying the constructional solutions and the production processes; and finding new original solutions that will stimulate the interest of the child.

OBJECT AND SUMMARY OF THE INVENTION

The object of the present invention is hence to improve the known solution referred to above so that one or more of the aforementioned targets may be achieved.

Specifically, the present invention regards a method and a toy according to the claims.

The claims form an integral part of the technical teaching provided herein in relation to the invention.

BRIEF DESCRIPTION OF THE DRAWINGS AND DETAILED DESCRIPTION OF THE INVENTION

Further characteristics and advantages of the invention will emerge clearly from the ensuing description with reference to the annexed drawings, which are provided purely by way of non-limiting example and in which:

FIGS. 3A and 3B are schematic illustrations of the method described herein;

FIGS. 6A and 6B are schematic illustrations of the method described herein for providing the toy of FIGS. 5A and 5B;

Figure 7A:
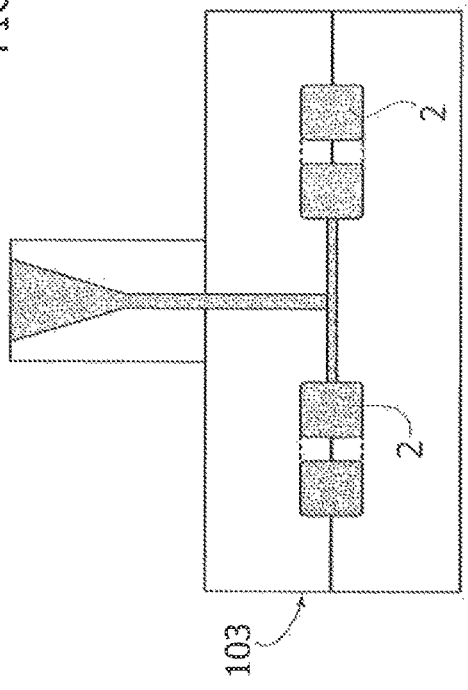
Figure 7B:
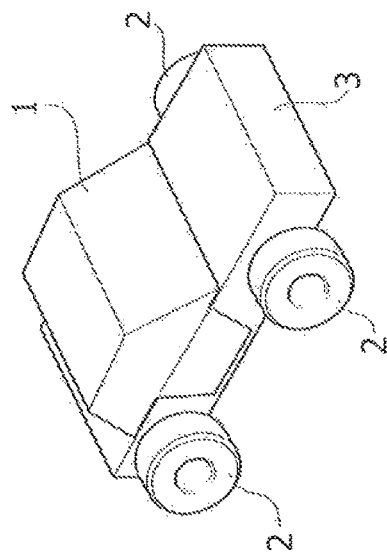
Figure 7C:
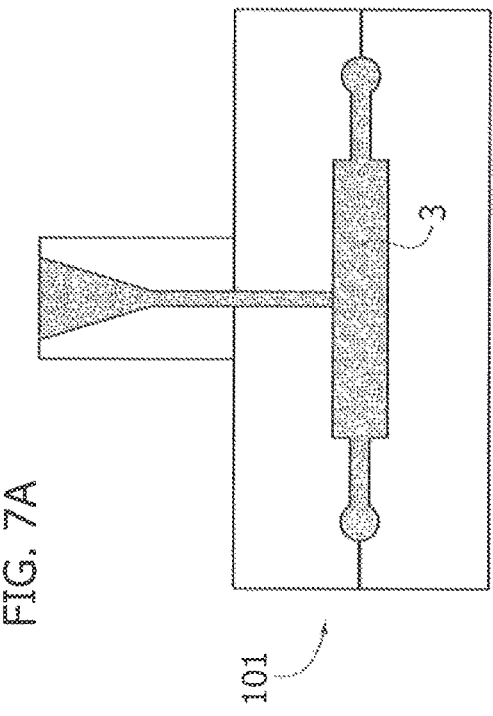
Figure 8:
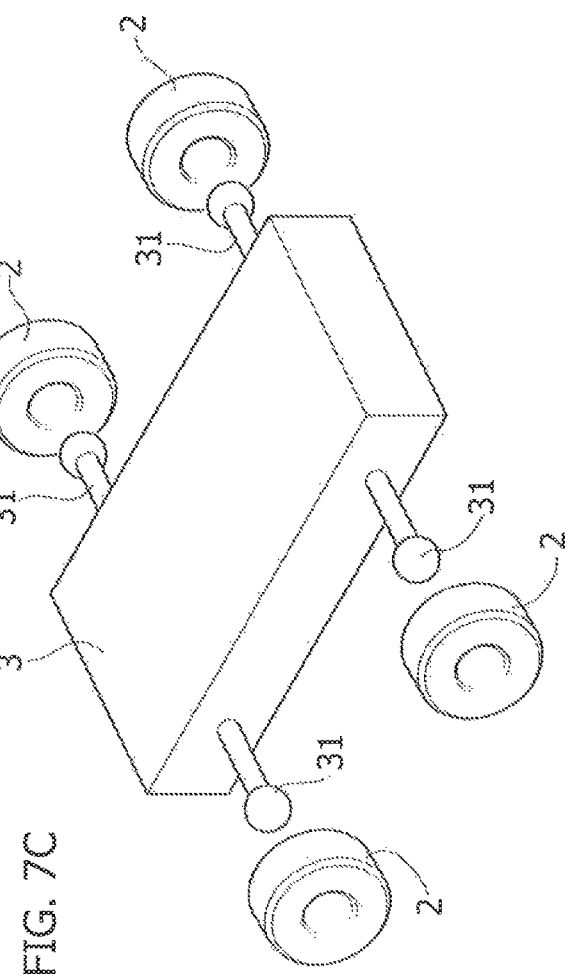
Figure 9:
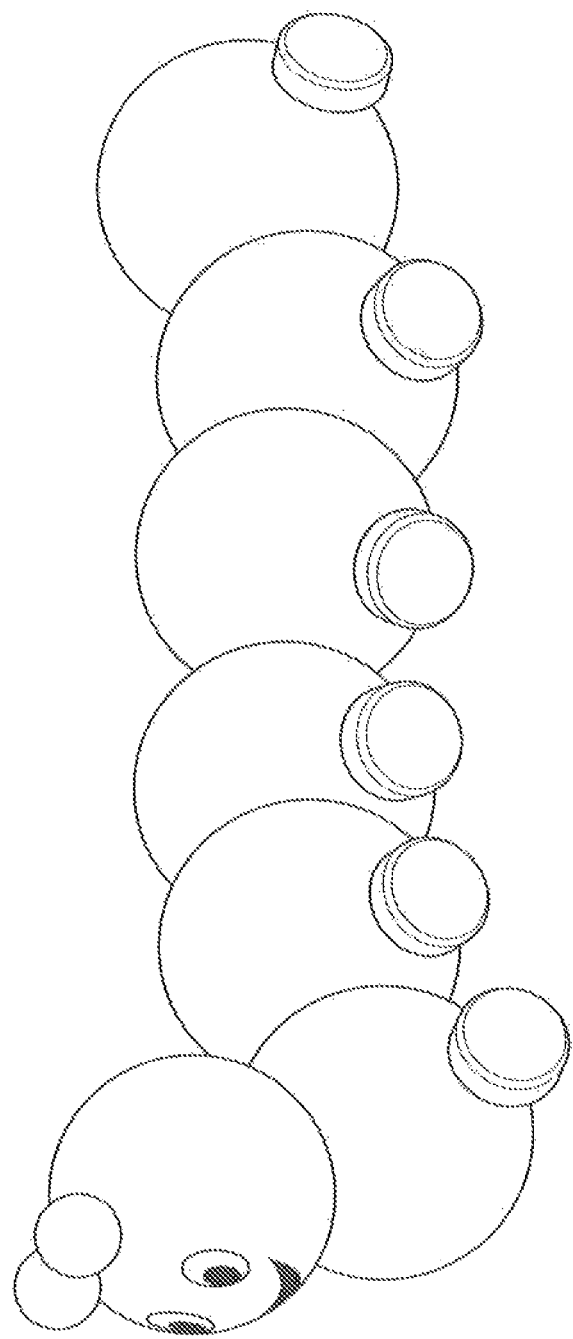

FIGS. 7A, 7B, and 7C illustrate a method for producing a toy according to the known art;

FIG. 8 illustrates a toy obtained with the method represented in FIGS. 7A, 7B, and 7C; and FIG. 9 illustrates a further example of toy obtained via the method described herein.

In the ensuing description, various specific details are illustrated aimed at enabling an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As mentioned above, the present invention relates in general to toys that are provided with wheels and that are made of plastic material.

The use of plastic materials for producing toys is nowadays widespread owing to a series of advantages that these materials guarantee, amongst which i) the fact that the objects can be produced in a wide range of configurations and ii) the fact that the materials are relatively easy and inexpensive to process and treat.

FIG. 8 illustrates a known solution of toy car. This comprises a supporting body 3, a bodywork 1, and wheels 2 rotatably mounted on the supporting body 3. Like the known solution discussed above with reference to the document No. EP 0074765, the supporting body 3 incorporates in itself shafts 31 with widened ends, on which the wheels 2 are slotted.

The supporting body 3 and the wheels 2 are made of plastic material and, in particular, are both obtained via a process of injection moulding.

In this connection, FIGS. 7A-C illustrate schematically a method for the production and assembly of these two components. This method envisages two different processes of injection moulding, a first for formation of the supporting body 3, which envisages the use of a first mould 101 (FIG. 7A), and a second for formation of the wheels 2, which envisages the use of a second mould 103 (FIG. 7B). The components in question, once formed within the respective moulds, are removed and connected together in a subsequent step (FIG. 7C). The latter operation is commonly performed manually.

The present invention proposes a new method of production that improves the solution referred to above.

In what follows, the method described herein will be illustrated with reference to a process for producing a toy car, but it is clear that the same principles may be used for providing, in general, toys of different types.

Figure 1:
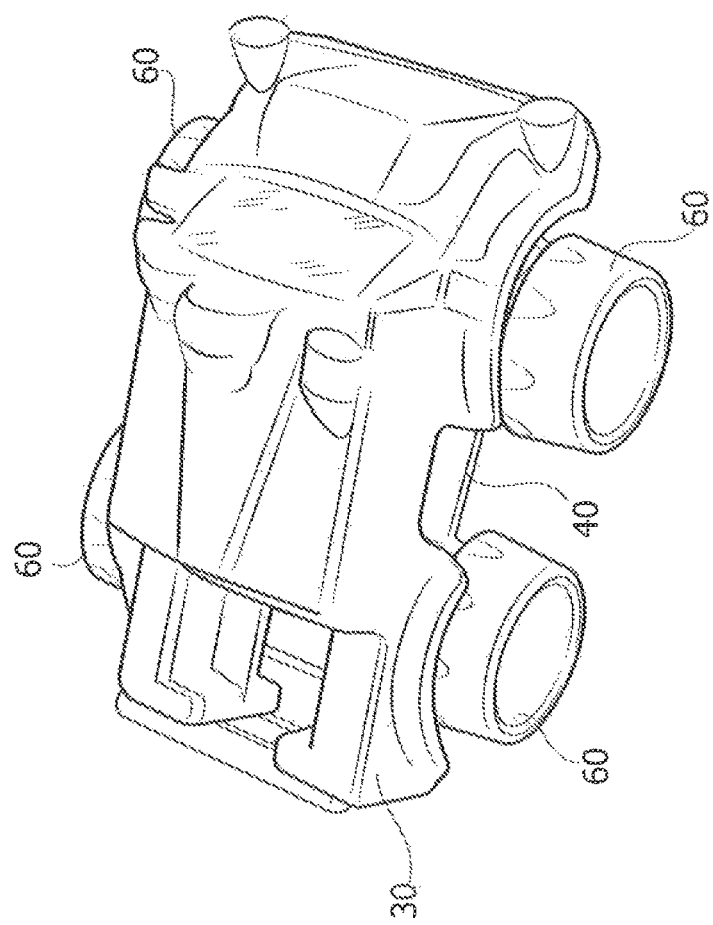
FIG. 1 illustrates an example of toy obtained via the method described herein.

Now, with reference to FIG. 1, this illustrates a toy car that is constituted by a supporting body 40, a bodywork 30, and wheels 60 rotatably mounted on the supporting body 40.

The supporting body 40 and the wheels 60 are produced according to the method described herein.

In general, this method envisages implementing a process of injection moulding that envisages a first step of forming one of the two components, i.e., either the supporting body or else the wheels, and then, a second step of forming the other component, i.e., the wheels or the supporting body, which is formed directly on the component previously produced.

The method uses, in particular, a moulding assembly that is prearranged for assuming two different configurations: a first configuration in which a cavity or a plurality of cavities is defined for enabling injection moulding of the first component, for example the supporting body, and a second configuration in which a cavity or a plurality of cavities is defined for enabling injection moulding of the second component, i.e., the set of wheels, with reference once again to the above example.

Once again with reference to the above example for ease of illustration, in the second configuration of the moulding assembly, the supporting body that has been formed in the previous step continues to remain within the moulding assembly and itself comes to delimit, with its specific portions, the cavities of the moulding assembly for moulding of the wheels.

The wheels are hence moulded directly on the supporting body and at the end of the process come to be mounted thereon in such a way that they are free to turn.

As will be seen in what follows, the aforesaid portions of the supporting body that come to delimit and define the cavities for forming the wheels in the moulding assembly may have a preferred conical or frustoconical shape, for the advantages that will be discussed in what follows.

Preferred embodiments of the method described herein will be illustrated hereinafter.

With reference to the embodiment illustrated in FIGS. 3A and 3B, this envisages the use of a moulding assembly 20, which comprises a fixed block 22 and two different formations of mobile blocks 23, 24, 25 and 23', 24', 25', which are prearranged for alternatively coupling to and operating with the block 22. Through these mobile blocks, the moulding assembly is prearranged for assuming a first configuration that is defined by the block 22 and by the blocks 23, 24, 25, and a second configuration that is defined by the block 22 and by the blocks 23', 24', and 25'.

With reference to the first configuration illustrated in FIG. 3A, here the moulding assembly defines a cavity 300 for moulding the supporting body 40 of the toy. One or more runners—not illustrated—made in the fixed block 22, feed into the cavity 300 the molten plastic material that will come to form the component. FIG. 3A illustrates the supporting body 40 already formed in the cavity 300.

In the second configuration illustrated in FIG. 3B, the moulding assembly 20 continues to enclose the supporting body formed, defining therewith a set of cavities 400 for moulding the wheels 60. As may be seen in this figure, the cavities in question are delimited both by the moulding surfaces of the various blocks and directly by individual portions of the supporting body itself. The wheels 60 are formed within the cavities 400 directly on these portions of the supporting body.

Figure 2:
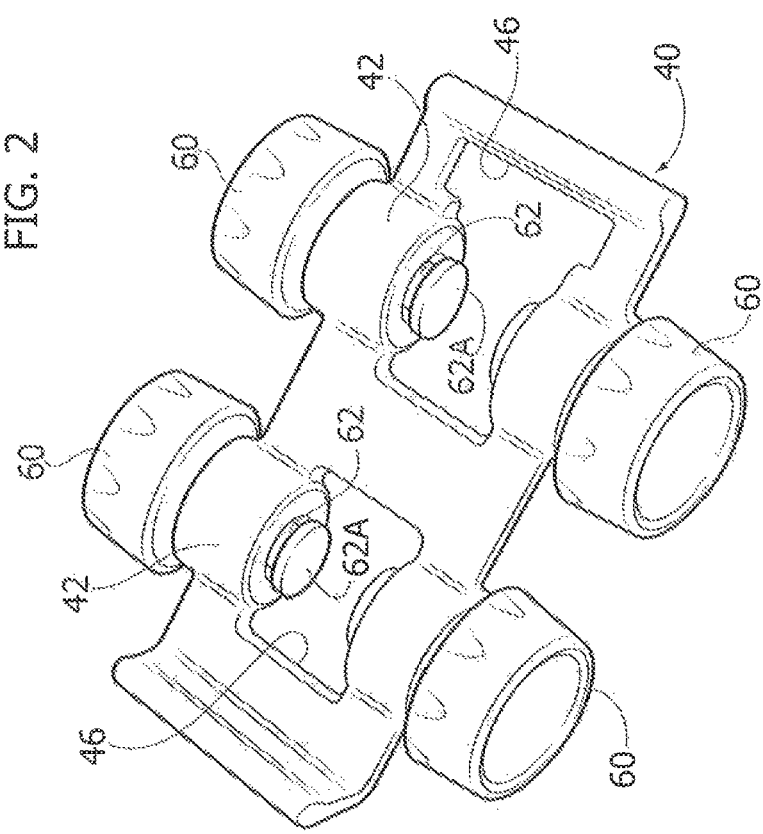
FIG. 2 illustrates the bottom part of the toy of FIG. 1.
Figure 4A:
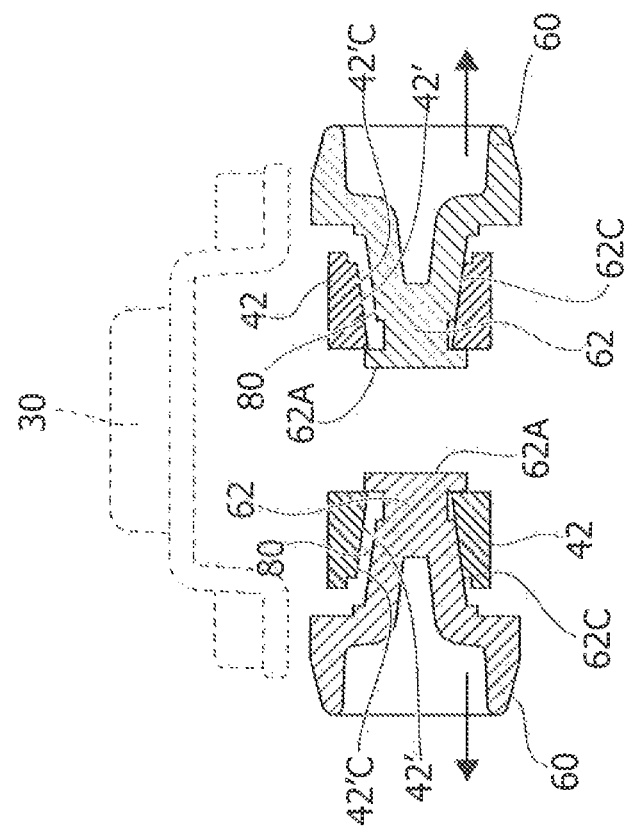
FIGS. 4A and 4B are schematic illustrations of the toy of FIG. 1, in which the wheels of the toy are once again in two respective different positions.

For a clearer understanding of the above aspects, the reader is now referred to FIGS. 2 and 4A, which illustrate in detail the parts of the toy car obtained via the method described herein.

With reference to FIG. 2, the supporting body 40 has four annular portions 42 provided with internal holes 42' (FIG. 4B), received within which are corresponding pins 62 that are made of a single piece with the individual wheels 60. The pins 62 have widened ends 62A and project out of the annular portions 42, within openings 46 made in the support 40. The internal holes 42' are smaller than the widened ends of the pins 62, at least in their sections facing the widened ends 62A, so that the wheels are constrained and cannot be removed from the portions 42.

It may now be noted that the internal holes 42' correspond to the aforementioned portions of the supporting body that are designed to delimit the cavities 400 for moulding the wheels 60. In particular, as may be clearly seen in FIG. 3B, these holes are prearranged for delimiting the cavities 400 together with the corresponding forming surfaces of the blocks 22, 23', 24', 25', which identify the second configuration of the moulding assembly. The aforementioned runners made in the fixed block 22 are designed to feed the molten plastic material also into the cavities 400 themselves. FIG. 3B illustrates the wheels 60, and their pins 62, already formed in the respective cavities 400.

With reference to FIG. 4A, it may again be noted that the internal holes 42' have a conical or frustoconical shape for at least part of their extension. The pins 62 are directly obtained within these holes and hence have a conical shape that is perfectly complementary. These conical portions of the holes 42' and of the pins 62 are designated by the reference numbers 42'C and 62C, respectively. Furthermore, the pins 62 are formed so as to traverse the holes 42' and project from the portions 42, positioning their ends 62A at a given distance from the latter.

In various preferred embodiments, the plastic material used is different for the supporting body and for the wheels. In particular, it is preferable to use two materials that have a low chemico-physical affinity in order to prevent any adherence between the two materials. Clearly, it is preferable for the material used for formation of the supporting body to have a melting point higher than that of the material of the wheels, so as to prevent localized melting of this body in its portions 42'C, when these come to delimit the cavities 400 for forming the wheels during the second step of the moulding process. In various preferred embodiments, the supporting body is made of nylon, whereas the wheels are made of polyethylene.

At the end of the second moulding step, the moulding assembly is opened, and the ensemble already assembled, constituted by the supporting body 40 and by the wheels 60 can be taken out.

It should now be noted that the wheels 60 are perfectly free to turn, even though they have been moulded directly on the supporting body.

This is guaranteed by the aforementioned conical portions 42'C and 62C, which come to constitute the interface of the rotatable coupling between the wheels 60 and the supporting body 40.

Figure 4B:
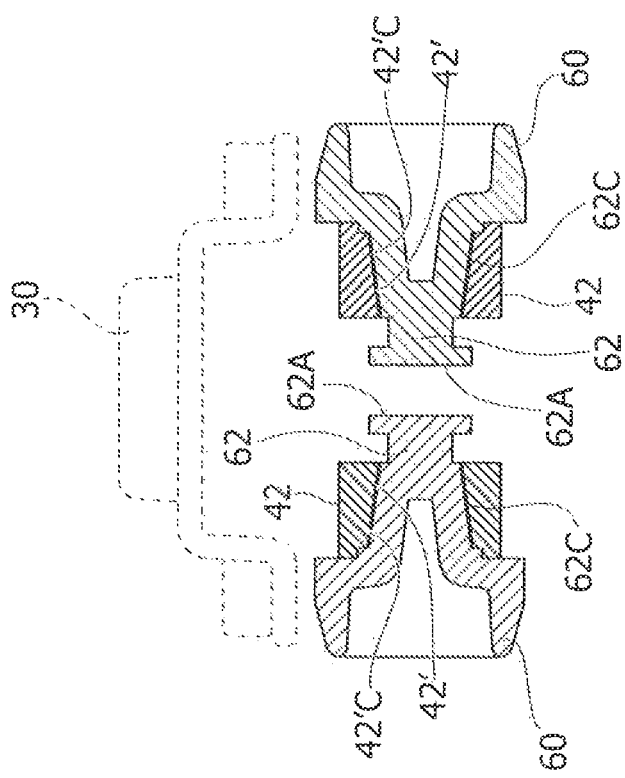

In fact, with reference to FIGS. 4A and 4B, it may be noted that, as soon as the supporting body 40 and the wheels 60 are removed from the moulding assembly, the wheels 60 do not remain in the condition illustrated in FIGS. 3B and 4A but tend instead to move by gravity towards the outside, until their widened end 62A comes to bear upon the annular portion 42. This movement is favoured, precisely, by the conical portions 42'C and 62C.

In this new position, between the pin 62 of the wheels and the hole 42' of the portions 42 a gap 80 is created, which sets the wheels in a condition of being freely rotatable with respect to the supporting body. The axis of rotation of the wheels will correspond approximately to the geometrical axis of the conical portions 42'C and 62C.

It should now be noted that it is possible to envisage different variants of the embodiment illustrated above.

In the first place, it is possible to reverse the moulding steps described and hence envisage first moulding of the individual wheels and then moulding of the supporting body, once again in a condition where the second step is directly carried out on the components already formed in the first step. To do this, it is sufficient to envisage a different conformation of the blocks of the moulding assembly and, in particular, of their forming surfaces.

Furthermore, also the specific configuration of the toy and of its parts obtained with the method described herein may differ from the one illustrated above.

Figure 5A:
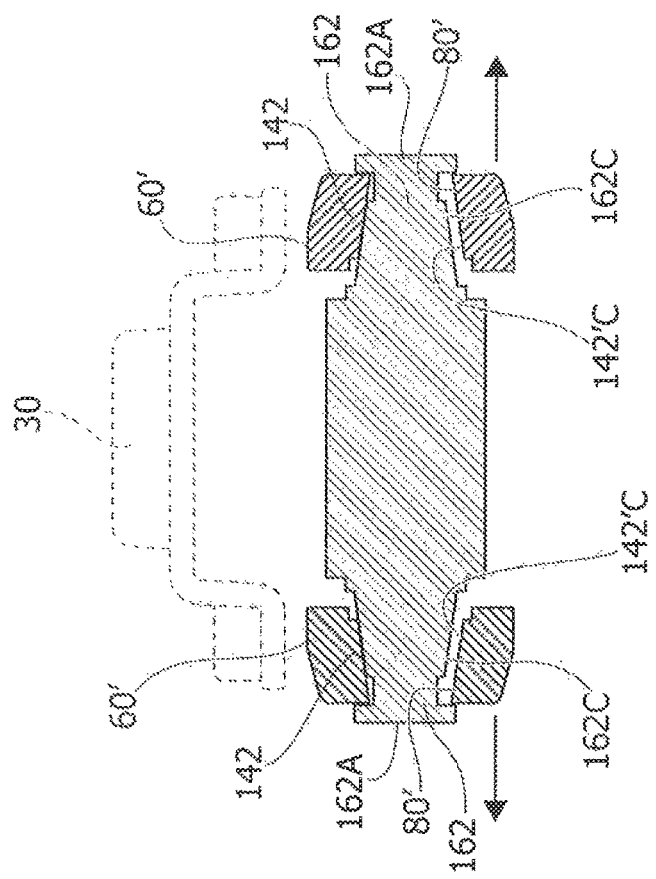
FIGS. 5A and 5B illustrate the same concept as the one schematically represented in FIGS. 4A and 4B but with a further example of toy.
Figure 5B:
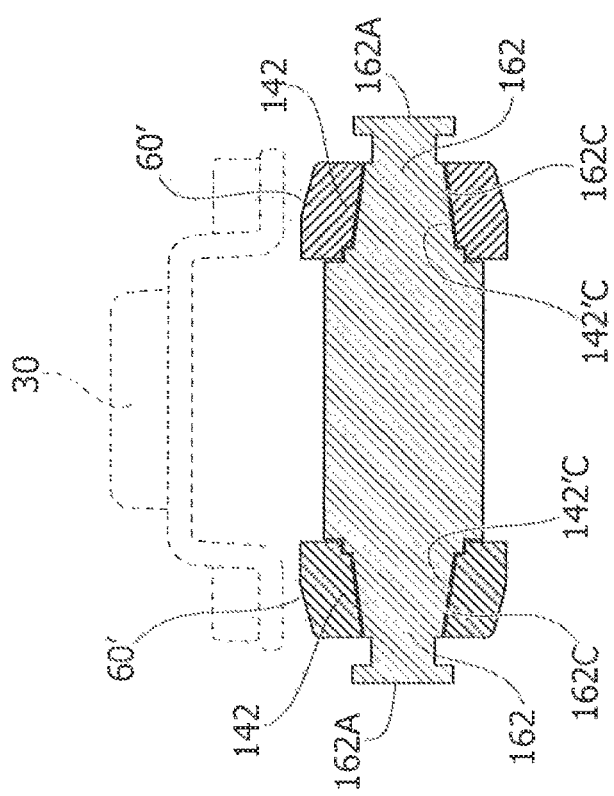

In this connection, FIGS. 5A-5B represent an alternative toy solution, in which the so-called male-female configuration of the coupling between the wheels and the supporting body is completely reversed with respect to the one illustrated in FIG. 2.

The supporting body of the solution illustrated in the above figures has in fact shafts 162—and not annular portions 42 as in the solution illustrated previously—and the wheels 60' have, instead, a central hub 142 coupled to the aforesaid shaft—and not pins 62.

Apart from the above differences, in this solution the general principles illustrated are reproduced in a way altogether corresponding to what has been described above.

In this connection, FIGS. 6A and 6B represent the method and the means used for producing the supporting body and the wheels in this variant embodiment.

In a way altogether corresponding to what has been described above, the moulding assembly 20' used is also in this case constituted by different blocks and is prearranged through these for assuming two configurations, a first one—illustrated in FIG. 6A—in which it defines a cavity 300' for moulding the supporting body, and a second one—illustrated in FIG. 6B, in which it defines a set of cavities 400' for moulding the wheels.

The cavities 400' are delimited by the outer surfaces of the shafts 162 previously formed of the supporting body, and moulding of the wheels is made directly on these shafts. In particular, the hubs 142 of the wheels 60' are formed on these shafts.

Like the holes 42' and the pins 62 of the solution illustrated in FIG. 2, the shafts 162 have a conical shape for at least part of their extension, and the hubs 142 will hence envisage internal holes of a perfectly complementary shape. The shafts 162 have, moreover, widened ends 162A, just as the pins 62 of the solution of FIG. 2. The conical surfaces of the shafts and of the hubs are designated in the figures by the reference numbers 162C and 142'C, respectively.

Furthermore, in a way similar to what has been described above with reference to FIGS. 4A and 4B, after the supporting body and the wheels 60' are removed from the moulding assembly 20', the wheels move for gravity towards the outside of the shafts 162, as far as into contact with their corresponding widened ends 162A, thus creating the gaps 80', which set the wheels 60' in the condition of being free to turn (FIGS. 5A and 5B) with respect to the shafts.

In the light of the foregoing, the advantages of the solution described herein will now emerge clearly.

In the first place, as compared to the known solution mentioned at the start, the method described herein clearly presents the advantage of being able to produce the supporting body and the wheels in a single moulding process, eliminating the step of assembly between the supporting body and the wheels that is necessary in the known process.

Concentrating, then, on the toy that is obtained via the method described herein, it may be noted that it is characterized by a coupling between the wheels and the supporting body that practically cannot be separated, thanks to the widened ends 62A and 162A that are provided for constraining the wheels to the supporting body.

In this connection, in various preferred embodiments, as in the one illustrated, the aforementioned widened ends have a circular section that identifies a diameter at least 20% larger than the diameter of the smaller section of the holes within which the corresponding pins or shafts are received.

Thanks to the above characteristics, the risk of a child possibly detaching the wheels from the supporting body is completely eliminated, and hence there is the guarantee that the child will not be exposed to any risks associated to handling of small parts.

Finally, it should be noted that thanks to the method described herein, the production of toys provided with mobile wheels is considerably simplified, so that it becomes possible to produce in an industrial context and at contained costs, a wide range of original solutions in the production of toys. In this connection, FIG. 9 illustrates an example of toy that is characterized in that it envisages a long series of wheels mounted on a single main body. In the light of what has been said above, this toy may be formed and obtained directly with the process of injection moulding provided in the method described herein.

Of course, without prejudice to the principle of the invention, the details of construction and the embodiments may vary, even significantly, with respect to what has been illustrated herein purely by way of non-limiting example, without thereby departing from the scope of the invention, as is defined by the annexed claims.

The invention claimed is:

1. A method for producing a toy, in particular a toy car, wherein said toy comprises:
   a supporting body (42; 162);
   a number of wheels (60; 60') rotatably mounted on said supporting body (42; 162), about respective axes of rotation;
   said method being characterized in that it includes the following steps:
   providing a moulding assembly (20; 20') for carrying out a process of injection moulding;
   setting said moulding assembly (20, 20') in a first configuration in which a first moulding cavity or plurality of moulding cavities (300; 300') is defined for forming said supporting body (42; 162);
   carrying out injection moulding of said supporting body (42; 162), within said first moulding cavity or cavities (300; 300'), via a first plastic material;
   setting said moulding assembly (20; 20') in a second configuration, in which second moulding cavities or a second moulding cavity (400; 400') is defined for producing said number of wheels (60; 60') on said supporting body (42; 162);
   carrying out injection moulding of said number of wheels (60; 60') on said supporting body (42; 162), within said second moulding cavities or said second moulding cavity (400; 400'), via a second plastic material,
   wherein said first moulding cavity or cavities (300; 300') is/are configured for providing in said supporting body (42; 162) first surfaces (42'C;) for coupling to said wheels (60; 60'), about said axes of rotation, wherein
   said second moulding cavities or cavity (400; 400') are/is delimited by said first coupling surfaces (42'C), wherein injection moulding of said wheels (60; 60') determines creation in these of second surfaces (62C) against said first coupling surfaces (42'C; 142'C) for coupling of said number of wheels to said supporting body, wherein said second surfaces (62C) are within a boundary formed by said first surfaces (42'C), and, wherein said first and second surfaces (62C; 162C; 42'C; 142'C) have a conical or frustoconical shape that develops about said axes of rotation, which includes forming an annular portion (42) in said supporting body (42) which has inner surfaces designed to constitute said first coupling surfaces (42'C); and which includes forming a pin (62) in said number of wheels (60) which define outer surfaces designed to constitute said second coupling surfaces (62C);

wherein said pin (62) and said annular portion (42) are formed according to a configuration where said pin traverses said annular portion (42) and projects with a widened end (62A) that is positioned at a given distance from said annular portion (42) in such a way that said wheels are movable away from said supporting body, along said axes of rotation, until said widened ends come into contact with said annular portion (42).

2. The method according to claim 1, wherein said second material is different from said first material, and wherein said first material is characterized by a melting point higher than that of said second material.

3. A toy obtained via a process of injection moulding, characterized in that it comprises:

a supporting body (42; 162); and a number of wheels (60; 60') rotatably mounted on said supporting body (42; 162), about respective axes of rotation;

wherein said body (42; 162) is obtained via injection moulding of a first plastic material, and said number of wheels (60; 60') is obtained via injection moulding of a second plastic material;

wherein the step of moulding of said number of wheels (60; 60') or of said supporting body (42; 162) is carried out on said supporting body or said number of wheels that has already been formed;

and wherein said supporting body (42; 162) includes first surfaces (42'C) for rotatable coupling to said wheels, about said axes of rotation, and wherein said number of wheels include second surfaces (62C) that are obtained via injection moulding on said first surfaces and engage said first surfaces for rotatable coupling to said supporting body (42), wherein said second surfaces (62C) are within a boundary formed by said first surfaces (42'C), and wherein said first and second surfaces (62C; 42'C) have a conical or frustoconical shape that develops about said axes of rotation, wherein said toy has in said supporting body (42; 162) an annular portion (42) that has inner surfaces designed to constitute said first coupling surfaces (42'C), and said toy has, in said number of wheels (60; 60') a pin (62) that defines outer surfaces designed to constitute said second coupling surfaces (62C), wherein said pin traverses said annular portion (42) and projects with a widened end (62A) that is positioned at a given distance from said annular portion (42) in such a way that said wheels are movable away from said supporting body, along said axes of rotation, until said widened ends come into contact with said annular portion (42).

4. The toy according to claim 3, wherein said second material is different from said first material, and wherein said first material is characterized by a melting point higher than that of said second material.

\* \* \* \* \*